May 8, 1962      R. M. BROWN      3,033,505
CHRISTMAS TREE HOLDER
Filed Feb. 4, 1959
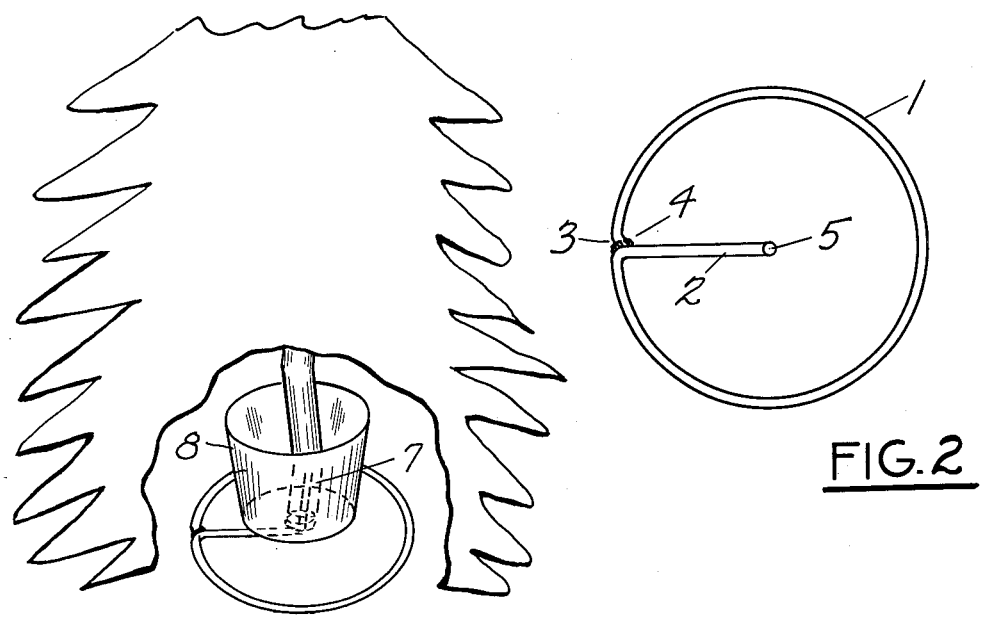
FIG. 1
FIG. 2
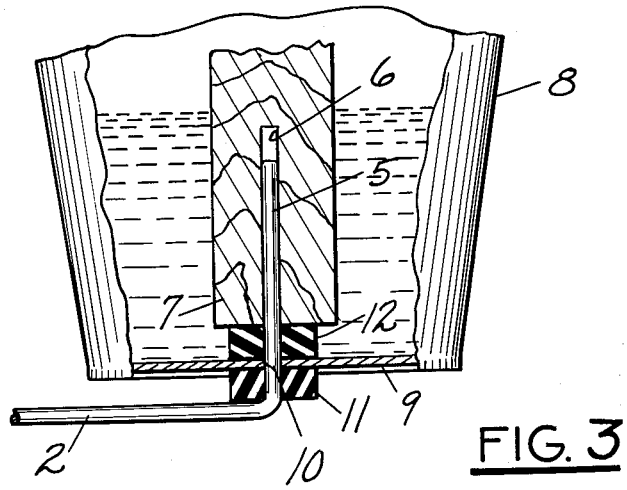
FIG. 3
INVENTOR.
Roger M. Brown
BY
Ralph Hammar
Attorney

United States Patent Office 3,033,505
Patented May 8, 1962

3,033,505
CHRISTMAS TREE HOLDER
Roger M. Brown, 108 S. Center St., Corry, Pa.
Filed Feb. 4, 1959, Ser. No. 791,173
2 Claims. (Cl. 248—44)

This invention is intended to support Christmas trees in an upright position, even trees with crooked trunks or which are not cut square. It also provides a convenient structure for keeping the lower end of the trunk immersed in water to prevent drying of the needles.

In the drawing, FIG. 1 is an elevation of a Christmas tree supported in the holder, FIG. 2 is a top plan view of the holder, and FIG. 3 is a fragmentary section through the lower end of the tree trunk showing the manner of attachment of the holder to the tree and of keeping the lower end of the tree trunk immersed in water.

The holder has a base of mild steel rod adapted to lie flat on a supporting surface comprising a ring shaped section 1 and an arm 2 extending radially inward from the periphery toward the center of the ring. The diameter of the ring section 1 will depend upon the size of the tree to be supported. For the large size trees having a height of 8–10 feet, a diameter of two feet is adequate. It will be noted that one end 3 of the rod is attached by a weld 4 at the junction of the arm 2 with the ring thereby making the ring 1 and the arm 2 a continuous rigid structure. The arm 2 terminates in an upwardly extending prong 5 which has a friction fit in a hole 6 drilled into the lower end 7 of the Christmas tree trunk. No particular care is required in drilling the hole 6. When the holder is made of ½″ rod as it might be for large size trees, the hole 6 is drilled with a ½″ drill. For the smaller trees where ⅜″ rod might be used, a ⅜″ drill is used for the hole.

Christmas trees are difficult to support in an upright position. It is difficult to cut the trunk of the tree square so that a holder which relies upon the surface of the cut to position the tree will invariably support the tree in an inclined position unless shims are used between it and the floor. Many of the Christmas tree trunks grow crooked so that a cut which is square with the lower end of the trunk of the tree will not support the tree upright. The difficulty of holding Christmas trees with crooked trunks is such that tree growers are unable to sell these trees, which often comprise as much as a third of the crop, even though they may have better appearance than trees with straight trunks.

With the present holder, there is no problem at all in supporting the tree in an upright position. Even if the trunk is very crooked as illustrated in FIG. 1, and the hole 6 is drilled out of line, as soon as the prong 5 is inserted in the hole 6, the tree can be tilted in any direction desired to bring it into the most pleasing position. The base 1, 2 provides a firm support on the floor and the leverage provided by grasping the tree at arm height is more than adequate to tilt the prong 5 so that it will support the tree in the desired position. The mild steel rod is easy to bend and the connection between the prong 5 and the base takes a set as the tree is tilted so that the tree after being tilted to an upright position remains in place.

A tree grower, by drilling holes 6 in trees with crooked trunks and mounting the trees on the holder, will be able to dispose of trees which could not otherwise be sold. Frequently, some of the trees with the best appearance have crooked trunks which have heretofore interfered with the sale. Since no particular care is required in drilling the hole 6, it can be done by almost any user.

In addition to supporting the tree in an upright position, the holder also provides a convenient structure for keeping the lower end of the trunk immersed in water. For this purpose, a water tight container 8 which might, for example, be made of treated paperboard has at the center of its bottom wall 9 a hole 10 through which the supporting prong 5 of the holder projects. On the underside of the wall 9 is a rubber bushing 11 telescoped over the prong 5 and squeezed between the bottom wall 9 of the container and the arm 2 of the base of the holder. On the upper side of the bottom wall 9 is another rubber bushing 12 which is squeezed between the bottom of the container and the cut surface at the lower end 7 of the trunk. The rubber bushings 11 and 12 ordinarily have a sliding fit on the prong 5 and the weight of the tree is adequate to compress these bushings into sealing engagement with the bottom wall 9 of the container and with the prong 5. Because the holder has no structure outside and above the lower end of the tree trunk, the container 8 can be of large size so that frequent filling is not necessary during the Christmas season.

When the holder is to be used with the water container 8, the container and the bushings 11 and 12 are slipped over the supporting prong 5 and the tree is then mounted on the prong. A downward pressure exerted on the tree trunk will exert the required clamping force from the cut surface on the lower end of the tree trunk to the sealing washers 11 and 12. The normal friction between the prong 5 and the hole 6 will maintain the seal even though the tree is moved after mounting on the holder.

What is claimed as new is:
1. In combination, a Christmas tree and a Christmas tree holder, said tree having a hole drilled upwardly into the lower end of the trunk of the tree through the cut bottom face of the trunk, said holder comprising a length of mild steel rod formed into a base adapted to rest on a supporting surface and an upwardly extending prong received with a friction fit in said hole, said base starting at one end of the rod and formed into a ring shape with an arm extending inwardly from the periphery toward the center of the ring and terminating at the other end of the rod in said upwardly extending prong, said one end of the rod being fastened to the base at the periphery of the ring adjacent said arm, said prong being tiltable by a force exerted on the tree while supported by the base on a supporting surface to adjust the tree to an erect position with respect to said supporting surface and the connection between the prong and the arm taking a set as the tree is tilted so that the tree after being tilted remains in place, a water container having a bottom wall with a hole therein through which said prong projects, and upper and lower sealing washers having a sliding fit on said prong on opposite sides of said bottom wall, the upper washer engaging the upper side of the bottom wall of the container and the cut bottom face of the trunk, the lower washer engaging the lower side of the bottom wall of the container and said arm, and said washers being held compressed between the lower end of the trunk and said arm by the friction between the prong and the hole in the trunk to prevent leakage of water through said hole in the bottom wall of the water container.

2. In combination, a Christmas tree and a Christmas tree holder, said tree having a hole drilled upwardly into the lower end of the trunk of the tree, said holder comprising a length of mild steel rod formed into a base adapted to rest on a supporting surface and an upwardly extending prong received with a friction fit in said hole, said base starting at one end of the rod and formed into a ring shape with an arm extending inwardly toward the center of the ring and terminating at the other end of the rod in said upwardly extending prong, and said prong being tiltable by a force exerted on the tree while supported by the base on a supporting surface to adjust the tree to an erect position with respect to said supporting surface and the connection between the prong and the arm taking a set as the tree is tilted so that the tree after being tilted remains in place.

References Cited in the file of this patent

UNITED STATES PATENTS

| | | |
|---|---|---|
| 1,511,597 | Fergusson | Oct. 14, 1924 |
| 2,459,533 | Irvin | Jan. 18, 1949 |
| 2,755,050 | Ford | July 17, 1956 |
| 2,786,641 | Applegate | Mar. 26, 1957 |

FOREIGN PATENTS

| | | |
|---|---|---|
| 45,286 | France | Apr. 23, 1935 |
| | (1st addition to No. 762,040) | |
| 426,864 | Great Britain | Apr. 10, 1935 |